United States Patent [19]

Kaelin et al.

[11] Patent Number: 4,807,348
[45] Date of Patent: Feb. 28, 1989

[54] HYDRAULICALLY ACTUATED LOCKBOLT COLLAR CUTTER AND METHOD OF CUTTING A COLLAR

[75] Inventors: John J. Kaelin, Saugerties; Gary L. Port, Woodstock, both of N.Y.

[73] Assignee: Huck Manufacturing Company, Irvine, Calif.

[21] Appl. No.: 213,520

[22] Filed: Jun. 29, 1988

Related U.S. Application Data

[63] Continuation of Ser. No. 136,467, Dec. 22, 1987, abandoned, which is a continuation of Ser. No. 927,195, Nov. 4, 1986, abandoned.

[51] Int. Cl.⁴ ..................... B23P 19/02; B26B 13/00; B26B 15/00; B26B 17/00
[52] U.S. Cl. ..................................... 29/426.4; 29/252; 30/92.5; 30/173
[58] Field of Search ................. 29/426.4, 252; 30/92.5, 30/173, 182, 279 R, 272 R, 180, 182

[56] References Cited

U.S. PATENT DOCUMENTS

| | | | |
|---|---|---|---|
| 870,441 | 11/1907 | Kerr | 30/272 R |
| 962,483 | 6/1910 | Whisler | 30/182 |
| 1,156,745 | 10/1915 | Brady | 30/182 X |
| 1,297,075 | 3/1919 | Braley | 30/182 X |
| 2,531,048 | 11/1950 | Huck . | |
| 2,688,185 | 9/1954 | Brazil et al. | 30/92.5 |
| 2,853,723 | 9/1958 | Winslow | 29/426.4 X |
| 2,994,955 | 8/1961 | Dowley | 30/182 X |
| 3,000,097 | 9/1961 | Hartz | 29/426.4 X |
| 3,001,548 | 9/1961 | Van Hecke . | |
| 3,733,699 | 5/1973 | Bock | 30/182 X |
| 3,915,053 | 10/1975 | Ruhl . | |
| 4,246,699 | 1/1981 | Riper | 30/182 |
| 4,285,126 | 8/1981 | Irwin | 30/182 X |
| 4,342,529 | 8/1982 | Smith . | |
| 4,587,829 | 5/1986 | Sukharevsky . | |
| 4,698,909 | 10/1987 | Sleigh | 30/182 X |

FOREIGN PATENT DOCUMENTS 1601772  11/1981  United Kingdom ............. 30/272 R

OTHER PUBLICATIONS

Instruction Manual Models 516-520-524-528-532-536 Hydraulic Collar Cutters published by Huck Manufacturing Company.
Huck Model 513 Hydraulic Collar Cutter Specification Sheet and Related Drawings—1984.

Primary Examiner—Charlie T. Moon
Attorney, Agent, or Firm—Robert F. Hess; Lawrence J. Shurupoff

[57] ABSTRACT

Method and tool for removing a swaged collar from a pin member of a lockbolt type fastener by using a tool having a housing with an opening therein having opposite wall, one wall having a pair of fixed spaced blades extending longitudinally of the collar and the other opposite wall having a piston operated ram, whereby said ram forces said collar against said blades to cut through and spread said collar to separate the collar from the pin member.

13 Claims, 4 Drawing Sheets

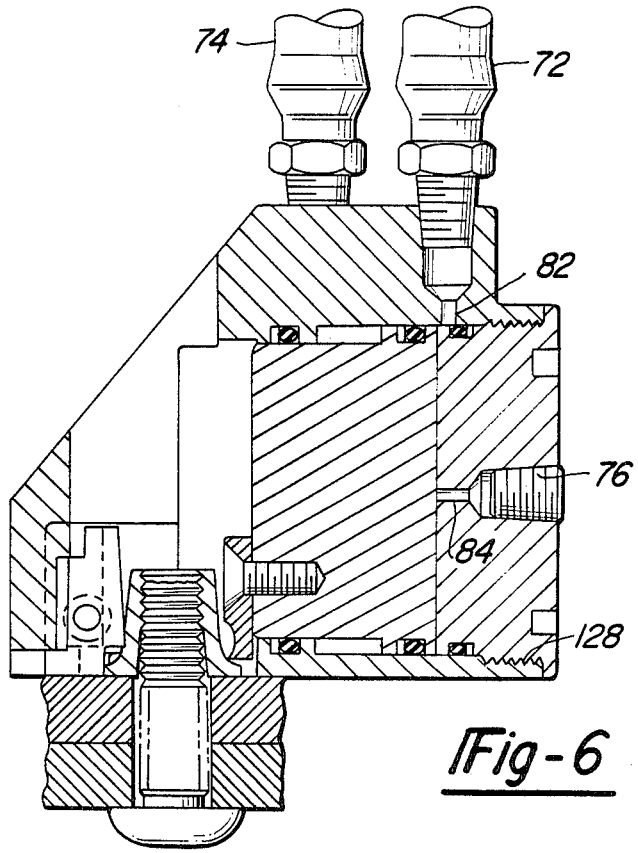
Fig-6
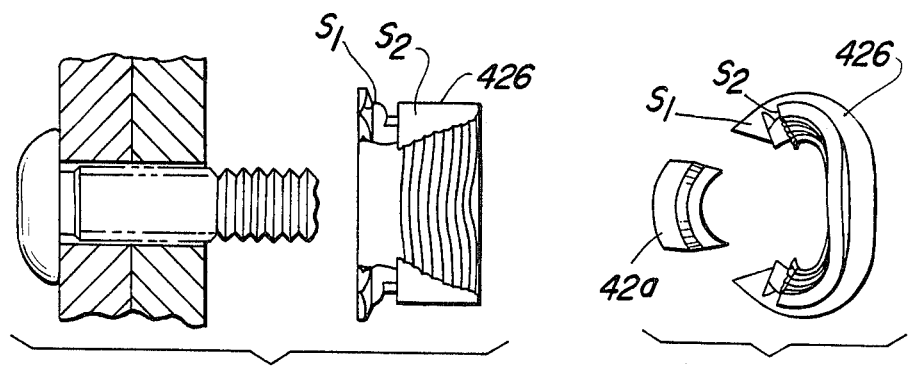
Fig-7
Fig-8

HYDRAULICALLY ACTUATED LOCKBOLT COLLAR CUTTER AND METHOD OF CUTTING A COLLAR

This application is a continuation of application Ser. No. 136,467, filed Dec. 22, 1987, now abandoned, which is a continuation of application Ser. No. 927,195, filed Nov. 4, 1986, now abandoned.

BACKGROUND AND SUMMARY OF THE INVENTION

The present invention relates generally to an automatically actuated device for removing a swaged metal collar or nut like member from a two piece lockbolt type fastener. Lockbolt type fasteners have been in use for many years. A typical example is shown in U.S. Pat. No. 4,342,529 to J. Ruhl and R. Dixon, which is incorporated herein by reference. Additional examples of such fasteners, which may also be referred to as two piece swage type fasteners include those shown in U.S. Pat. No. 3,915,053 to J. Ruhl and U.S. Pat. No. 2,531,048 to L. Huck. In each case the fastener comprises a pin and a generally annular collar adapted to be swaged into annular, non-helical lockgrooves in the pin. Because the collar is generally annular and the lockgrooves non-helical it is not possible to torque the collar off the fastener pin when one wishes to disassemble the joint secured by the fastener, as one can do with a helically threaded bolt and nut combination type fastener. Instead conventional practice has usually been to cut off the collar with a single bladed cutting chisel impacted either by a pneumatically actuated hammer or a hand held hammer. Such means are often unsatisfactory because of the time or energy required to complete the job. Further, in many instances there is not sufficient access to the fastened joint to permit such methods. An additional hardship is encountered with such techniques when the collar includes a prominent flange at the base of the fastened joint since chisel blade tends to ride over the flange. Even further, one cut through the collar rarely spread the collar sufficiently to allow the pin lockgrooves to completely disengage the interfitting swaged collar portions whereby the pin can be slipped out of engagement with the collar.

Another past practice includes cutting the collar off with a torch. Yet another technique, limited to non-flanged collars has been a hydraulically actuated collar cutter including two diametrically opposed, single edged cutting blades wherein one blade is hydraulically forced downwardly and forwardly through the collar along an axis inclined relative to the workpiece members claimped by the fastener. One of the principal difficulties with this latter system is that the cutting blade may dig into the workpiece member as it cuts the collar.

The present invention includes, but is not limited to, the following features:

1. Lightweight, hand-held and compact.
2. Automatically actuated by the same hydraulic power supply used by the automatic tools designed for installing such fasteners.
3. Cuts the collar clearly in one operation.
4. Spreads the collar substantially out of engagement with the lockgrooves to permit stripping of the pin from the collar.
5. Generally eliminate the need to perform any operations on the pin or collar subsequent to the cutting operation prior to disengaging the two fastener members.
6. Allows disassembly of pin and collar without destroying in any way the fastener hole in the members joined together by the fastener.
7. Removes lockbolts which have been incorrectly installed, e.g. where the pintail does not break away.

It is a general object of the present invention to provide an improved device for disassembling swage type fasteners.

It is another object of the present invention to provide an improved collar cutter including one or more of the features noted above and those as shown and described.

Additional advantages and features of the present invention will become apparent from the subsequent description and the appended claims taken in conjunction with the accompanying drawings.

BRIEF DESCRIPTION OF THE DRAWINGS

FIG. 6 is a cross-sectioned side view taken along lines 6—6 of FIG. 3.

FIG. 7 is an expanded side view of the fastener shown in FIGS. 1 and 2 after it has been severed by the collar cutter constituting the present invention.

FIG. 8 is an expanded end view of the fastener shown in FIGS. 1 and 2 after it has been severed by the collar cutter constituting the present invention.

DESCRIPTION OF THE PREFERRED EMBODIMENTS

Figure 1:
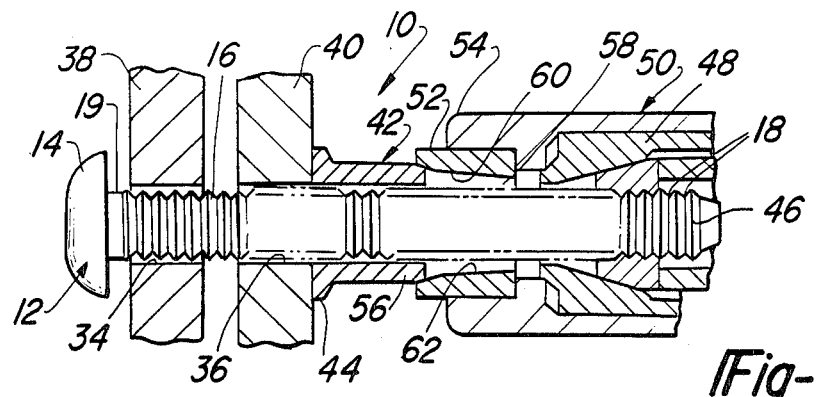
FIG. 1 is a partially sectioned view of a fastener in accordance with the present invention shown in operative relation to a pair of workpieces and having an installation tool in initial engagement with the fastener.
Figure 2:
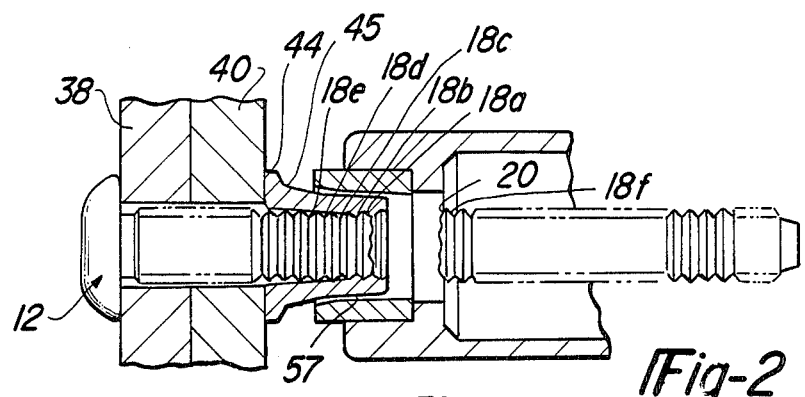
FIG. 2 is similar to FIG. 1 but illustrating the final step in the installation sequence showing the collar completely swaged onto the pin, pin break and the tool being backed off the collar.
Figure 3:
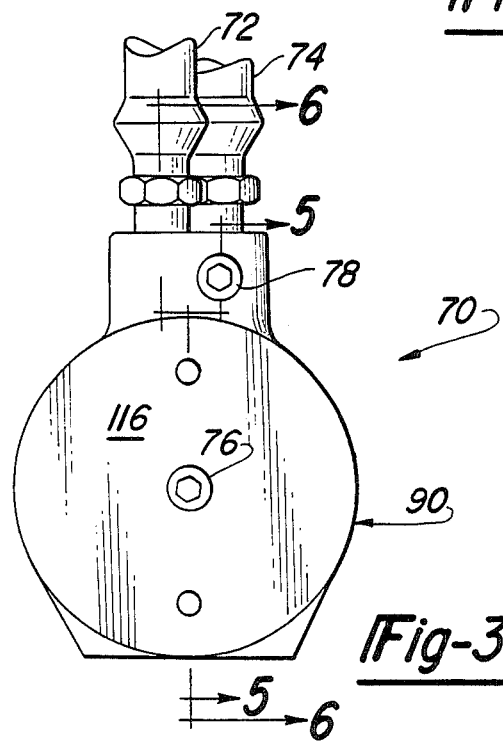
FIG. 3 is an end view of the present invention.
Figure 4:
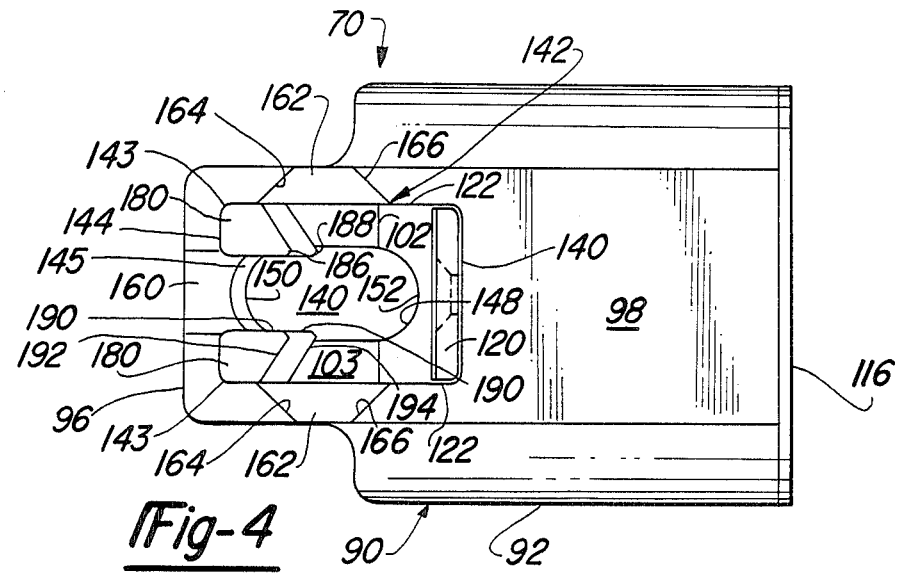
FIG. 4 is a bottom view of the present invention.

Referring now to the drawings and in particular to FIGS. 1 and 2 thereof, there is illustrated a fastener indicated generally at 10 comprising a pin member 12 having a head 14 provided on one end thereof and an elongated shank portion 16.

Shank portion 16 has a plurality of substantially identical annular combination locking and breakneck grooves 18 extending along substantially the entire length thereof and may include a relatively short smooth cylindrical portion 19 immediately adjacent the juncture with head 14. While smooth cylindrical portion 19 is illustrated as being relatively short, it may extend up to a length equal to a predetermined minimum total material thickness with which fastener 10 is to be used. Thus, grooves 18 will extend along the length of shank 16 from a point greater than this predetermined minimum thickness.

Fastener 10 is designed to be inserted in aligned openings 34 and 36 provided in a pair of members 38 and 40, respectively, which are to be joined by fastener 10. A tubular member 42 in the form of a generally cylindrically shaped collar is placed on shank portion 16 with flanged end portion 44 thereof being brought into engagement with member 40. As shown, shank portion 16 is of a length substantially greater than the total thickness of members 38 and 40 plus the axial length of collar 42 thereby providing an end portion 46 also having combination groves 18 which grooves may be engaged by jaws 48 of pulling tool 50.

Pulling tool 50 is of conventional construction having a swaging anvil 52 extending outwardly from the nose portion 54 of the tool 50; the jaws 48 are adapted to be moved rearwardly relative to anvil 52 as shown in the drawings. Anvil 52 of pulling tool 50 has a central frusto conically shaped opening 58 provided therein having a first relatively sharply tapered inner portion 60 and second tapered inner portion 62.

Actuation of pulling tool 50 will cause jaws 48 to engage and grip a predetermined number of combination grooves 18 and thereby exert a pulling or tensioning force upon pin 12 and against collar 42. During the initial stages of the pulling action, anvil 52 exerts an oppositely directed force on collar 42 thereby causing members 38 and 40 to be drawn into mutual engagement.

Thereafter, portion 60 of anvil 52 begins to deform or cause the outer end portion 56 of collar 42 to be extruded into a preselected one 18a of combination grooves 18. This initial deformation causes a locking action to occur between collar 42 and pin 12. Thereafter, continued movement of jaws 48 cause anvil 52 to move along collar 42 thereby causing the collar material to flow into combination grooves 18c, d, e, and possibly others approaching members 38 and 40 as well as continuing to compress the collar material which has been swaged into groove 18a.

Because of the defined groove configuration which is not part of the present invention, the continued compression and flow of the collar material into groove 18a causes an axially directed localized force to be exerted on sidewall 20 as a portion of the collar material experiences a backward extrusion or flowing to the right as seen in the drawings into the next outwardly disposed groove 18f. The axial component of swaging or material flow force developed by this continued compression and flow of the collar material in combination with the axial tension exerted by the pulling action of the jaws 48 will cause groove 18a to function as a breakneck with end portion 46 of pin 12 breaking thereat. It will also be noted that this swaging sequence results in a secondary flange portion 45 immediately adjacent flange 44 conforming to the shape of anvil 52 and of greater diameter than the remainder of barrel portion 57.

In other fastener constructions, the breakneck may be at a specific point along the pin and may extend well beyond the collar. In any event, the fastener is one in which the collar is swaged into non-helical, annular grooves and is not capable of being removed except by destruction, namely cutting or use of a torch.

The present invention, referring now to FIGS. 3–6 and 9, constitutes a generally cylindrical, hydraulically actuated tool 70.

Vertically oriented hydraulic lines 72, 74 provide the means for actuating the tool. If desired such lines can be horizontally disposed at inlets 76, 78, respectively, shown as being plugged. Thus fluid will be supplied to the end of the piston 80 during the power stroke either through passageway 82 or 84 and will be returned to a suitable reservoir during the return stroke through passageway 86 only or passageways 86 and 88, collectively, respectively. Tool housing 90 is a single casting of relatively high strength steel. It will be noted that the outer dimensions of housing 90 are maintained at the minimum required to handle the hydraulic operating pressures and collar cutting forces so that the tool will be of least weight and maximum compactness for lockbolt and collar sizes it is adapted to handle. This includes a barrel portin 92, power supply portion 94, nose or front end portion 96 and base portion 98 common to both the barrel and nose portions.

Figure 5:
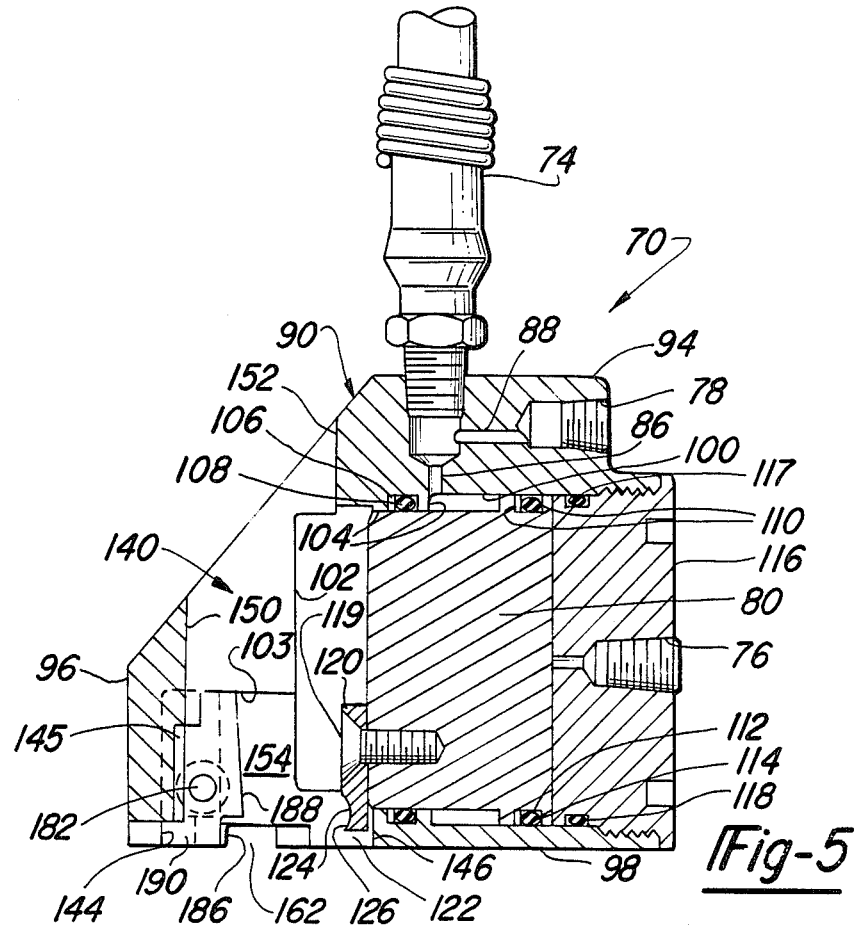
FIG. 5 is a cross-sectioned side view taken along the lines 5—5 of FIG. 3.

Barrel portions 92 includes an inner bore 100 of relatively constant diameter throughout its length terminating at a pair of abutment shoulders 102 constituting part of the nose portion. Extending radially into the bore 100 around its entire circumference is sealing flange 104 having groove 106 throughout, of general cross-sectional shape as seen in FIG. 5, for containing an O-ring type seal 108. Piston 80 travels within the bore and includes at one end a sealing flange 110 extending outwardly therefrom having a groove 112 and O-ring type seal 114 therewithin, similar to that at the forward end of the bore 100. The bore 100 is sealed by an end cap 116 having an O-ring type seal 117 at its forward end within groove 118. Seals 114 and 117 preclude hydraulic fluid bypass during the power stroke of the piston, whereas seals 108 and 114 preclude such bypass during the piston return stroke, as explained in more detail below. Attached to the piston by a screw 119 at its lowermost forward end is a ram 120 which extends the full width of collar access opening 142 and is contained by the sidewalls 122 of the collar access opening such that it provides a means for precluding rotation of the ram and thus the piston. Groove 124 extends the full width of ram 120 and provides a retaining edge 126 at the bottom of the ram. The height of the retaining edge 126 from the lower planar surface of base portion 98 (and member 40) is such that the retaining edge will just clear the collar flange 44 as best seen in FIG. 6. Finishing with the end cap 116 it will be noted that the cap is threaded at 128 into the barrel portion and diametrically opposed recesses are provided for installing or removing the end cap with a typical spanner wrench.

A primary feature of the present invention resides in the design of the nose portion 96 and the manner in which the dual edged cutter blades 180 cut and simultaneously spread the collar off the pin. Nose portion 96 includes an access chamber 140 for receiving the fastener. At the base portion 98 the access chamber is defined by the rectangular shaped collar access opening 142 defined by side shoulder 122, front wall 144 against which cutters 180 rest and rear wall 146.

At the top of nose portion 96 the access chamber functions as a pin access opening and is defined by a generally oval opening 148 of considerably less width, bounded on the sides thereof by abutment shoulders 102, at the front by wall 150 and at the rear by wall 152. The bottom access opening is thus sized to fit the preselected size range of collars to be cut and the uppermost access opening is sized for the corresponding pin size or pin diameter range.

Each abutment shoulder 102 terminates at lower wall 103 which defines the height of the collar access opening 154. The collar access opening may also be referred to as a collar receiving chamber whereas the remainder of access opening 140 may be referred to as an exposed pintail receiving chamber. While the fastener 10 shown at FIG. 6 is one in which the pintail is designed to break off within or slightly outside the collar 42, there are instances in which the pintail may fail to break off. If the collar is nonetheless swaged, or at least partly so, it will have to be cut off and a new fastener installed. The exposed pintail receiving chamber allows one to slip the tool 70 over the unbroken pintail. The top of the ram 120 resides just below lower wall 103 such that there is no interference during the piston power stroke.

Figure 9:
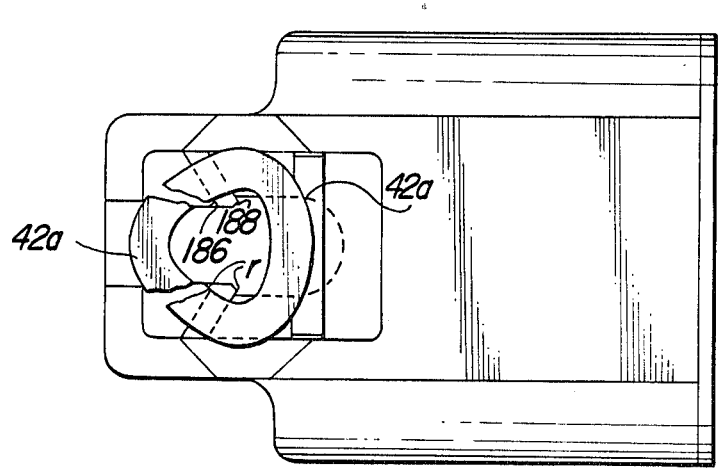
FIG. 9 is a bottom view of the present invention, similar to FIG. 4, but showing the split collar in the collar receiving chamber at the end of the collar cutting sequence and without the pin.

Further, front wall 144 includes a recessed portion 145 stepped back a distance generally equal to the thickness of the barrel 57 of any collar to be cut. The base portion 98 is relieved at both sides and the front to provide passages 162, 162 and 160 extending through to the collar receiving chamber 154. The side passages 162 are provided primarily as a means of allowing the collar flange 44 to spread as the cutters 180 move through it, as best seen in FIG. 9. However, both side passages 162 also serve as knockout passages, as explained below. The side passages each include walls 164 and 166 diverging outwardly towards the collar receiving chamber. Front passage 160, which serves solely as a knockout passage, is in width slightly greater than the distance separating cutters 180. It will be noted that front wall 144 is recessed transversely of the front knockout passage 160, thereby defining a U-shaped slot 143 within which cutter blades 180 may be received and firmaly restrained in all directions other than in the direction of the piston 80. The depth of each knockout opening is slightly greater than the ram retaining edge 126 is high so that, while the retaining edge will engage and embed secondary flange portion 45 of the collar during the piston power stroke, the front wall will have maximum engagement with only the barrel portion of the collar and the collar barrel portion may be spread the entire width of the collar receiving chamber.

The only remaining structural detail to be described is the pair of dual edged cutter blades 180. From FIGS. 4-6 and 9 it will be noted one blade is the mirror image of the other. Each is held to the housing by suitable means such as a screw 182 and each is received within a generally U-shaped pocket 143 within the nose portion 96 as earlier described. Each includes a lower collar flange cutting edge 186 and an upper collar barrel cutting edge 188. Each lower cutting edge is defined by outwardly diverging side walls 190 and 192, while each upper cutting edge is defined by outwardly diverging side walls 190 and 194. Side wall 190, common to both upper and lower cutting edgegs 188 and 186 is plane and as installed the walls 190 of each cutter blade are parallel and spaced a distance equal to or slightly greater then the maximum pintail diameter of the smallest or least diameter pin within the preselected range of pin sizes for the tool. Walls 192 and 194 are also straight, however alternatively, each may be curved so as to be concave thereby providing a thinner knife point but an equal degree of spread to the collar preferably curved on a slightly larger radius.

As seen best in FIGS. 5 and 6, each upper cutting edge 188 is inclined from the base thereof in a direction towards the front or nose portion such that the cutting edge will first embed the collar barrel portion at the secondary flange portion 45, thereby creating a reaction force that tends to press the tool down onto the collar.

Further it is preferred that each cutting edge include a slight relief r (as seen in FIG. 9) to increase the strength of the cutting edge and provide additional assurance that the blades will pass over the pintail and cut only the collar.

Cutters 180 and ram 120 are made of the usual hardened or higher carbon content steel, or carbide, to provide long life and cutting cycles against the softer steel collars.

In operation, the tool is powered by the same hydraulic fluid power supply as used for the installation tools used for swaged type fasteners, reference being made to U.S. Pat. No. 4,587,829 to B. Sukarevsky. A suitable power source is one such as shown in U.S. Pat. No. 3,001,548 to VanHecke. For a ⅝ inch nominal size pin the power stroke may require 5700 psi and the return stroke about 2400 psi. GIven a piston of approximately 2⅜ inch maximum diameter this will give a force of about 25,250 lbs to cut and spread the collar.

Upon actuation of an air or electric switch, fluid on the power stroke enters passageway 82 through inlet 72, forcing the piston toward the nose portion 96 until one seal flange 104 engages the other 110 which stops the forward travel. Forward piston travel causes ram 120 to engage the collar. As forward motion continues the collar will become wedged between the ram 120 and the upper cutting edges of blades 180. Further travel will simultaneously cause ram retaining edge 126 to embed itself into the secondary flange 45 of the collar while blade cutting edges 186,188 being near simultaneously cutting into the flange and barrel portions of the collar. As piston travel continues the collar is spread by the diverging cutting walls 190,192/194 of the blades until piston travel ceases. At this point as shown in FIG. 9 a minor collar portion 42a, will be nested between cutter blade walls 190 and the major collar portion 42b will be completely spread out of engagement with the lock grooves of pin 12. To further aid in understanding the cutting and spreading action of the tool, the cut surfaces of the collar which are spread by the upper and lower cutting edges of each blade are shown at 51 and 52, respectively, of FIGS. 7 and 8.

Upon completing the power stroke, the return stroke is actuated by release of the trigger and pressurized hydraulic fluid is supplied through inlet 74 and passage 86 to the chamber on the return side of piston 80. Given seal flange 110, the fluid force differential will cause the piston to retirn to its initial position shown in FIGS. 5 and 6 as the fluid on the power stroke side of the piston exits through passage 82.

At this point, the pin will be free from the collar and the tool can be removed from the now disassembled fastener and joint. Should any portion 42a or 42b of the collar remain wedged in the tool these pieces can be knocked out by inserting a screwdriver or the like through passages 160, or 162 and tapping it out.

While a specific tool structure has been described and illustrated above, it will be appreciated that the method used to cut and strip the flanged collar from the pin may be embodied in other devices. The method is generally that of:

1. Engaging said collar on diametrically opposed sides,
2. Causing a pair of cutting edges to simultaneously begin cutting through the flange and barrel portion of said collar and along the entire vertical extent or length of such collar,
3. Such side of blades parallel to the pin being spaced parallel from one another the diameter of the pin around which the collar is swaged,
4. The cutting edges causing the collar, both barrel and flange, to be spread off the pin progressively as the cutting sequence continues, and finally,
5. The collar being divided into segments, a major segment and a minor segment, by the cutting edges as the collar is completely severed, with the minor segment being disposed between the cutting edges and of a width equal to that of the pin and the ends of the major portion bring spread to such an extend that only the locking grooves at the side of the collar opposite the cutting edges continue to be engaged by the collar, and 6. Removing the collar completely from the pin.

While it will be apparent that the preferred embodiment of the invention disclosed is well calculated to provide the advantages and features above stated, it will be appreciated that the invention is susceptible to modificiation, variation and change without departing from the proper scope or fair meaning of the subjoined claims.

What is claimed is:

1. An actuatable tool for removing a swaged collar from a pin member of a lockbolt type fastener, the collar and pin member serving as a two piece lockbolt type fastener, said actuatable tool comprising: a housing having a collar receiving opening therein having opposite walls, a piston slidably mounted in said housing, power means operatively connected to said housing for moving said piston, a ram secured to the forward face of said piston to be positioned thereby at one of said opposite walls, and dual cutter blade means circumferentially spaced and longitudinally extending with respect to said opening and fixedly thereby at one of said opposite walls, and disposed from said ram and adjacent the other of said opposite walls, said spaced cutter bladed means and said ram receiving a swaged collar of a lockbolt type connector therebetween prior to actuation of said piston and further adapted to be engageable with the swaged collar upon actuation of said piston, said ram forcing said swaged collar with respect to said blade means to cause said blade means to cut through and spread said collar upon movement of said ram to thereby separate said collar from the pin member.

2. In the actuatable tool of claim 1, said ram including a retaining edge formed on said ram for engaging one side of said collar to embed said ram therein while said dual cutter blade means simultaneously cuts through the opposite side of said collar.

3. In the actuatable tool of claim 1, each of said dual cutter blade means having dual edge cutter blades.

4. In the actuatable tool of claim 3, said dual edged cutter blades each having upper and lower blades, each of said upper and lower blades having diverging cutting walls for spreading the collar as the blades cut through the wall of the collar.

5. In the actuatable tool of in claim 3, wherein one of each of said dual edged cutter blades engaging one portion of said collar, and the other of each of said dual edged cutter blades being inclined in a direction to initially engage the body portion of said collar in the vicinity of said one portion for producing a reaction force to press said housing against said collar.

6. In the actuatable tool of claim 1, said housing having spaced shoulders thereon with side passages aligned to receive portions of the collar which are spaced apart by said blade means.

7. In the actuatable tool of claim 4, said housing having spaced shoulders thereon with side passages aligned to receive portions of the collar which are spread apart by said dual edged cutter blades.

8. In the actuatable tool of claim 7, said dual edged cutter blades being spaced to define a knock-out space therebetween, said knock-out spaced receiving a cutaway minor portion of the collar, said side passages being configured to receive a major collar portion spread apart by said dual edged cutter blades.

9. The actuatable tool of claim 5 adapted to remove a collar having a flanged lower portion and upper barrel portion of lesser diameter wherein, said one of each of said cutter blades is said lower blade and said other of each of said cutter blade is said upper blade, said upper blade being of greater radial inward extent toward said collar at the lowermost portion thereof than is said lower blade, and said lower blade length exceeding the height of the flanged lower portion of the collar, whereby upon actuation of the tool the upper blade will make first contact with the barrel portion of the collar.

10. A method for removing a swaged collar from a pin member of a lockbolt type fastener wherein the collar and pin member serve as a two piece lockbolt type fastener, said method comprising the steps of:

a. providing an actuatable tool having a housing with a collar access opening therein;

b. fixing dual blade means circumferentially spaced and longitudinally extending with respect to the access hole;

c. providing a slidable piston in said housing with a ram on the forward face of said piston oppositely disposed from the dual blade means;

d. mounting the housing to dispose a collar of a lockbolt fastener in the access opening to be engageable by the dual blade means and the ram;

e. forcing said ram against the collar to cause it to move into engagement with the dual spaced blade means to thereby cause said dual blade means to cut through the wall of and spread said collar to separate it into major and minor parts for removal from the pin member of the lockbolt type fastener.

11. In the method of claim 10, spreading the major part of the collar while cutting through the wall thereof to remove the collar from the pin member.

12. In the method of claim 10, applying a reactive force between the dual blade means and the collar to force the housing against the collar during the cutting thereof.

13. In the method of claim 10, separating the minor part of the collar from the major part by providing a knock-out space between the dual blade means.

* * * * *

UNITED STATES PATENT AND TRADEMARK OFFICE
CERTIFICATE OF CORRECTION

PATENT NO. : 4,807,348

DATED : February 28, 1989

INVENTOR(S) : John J. Kaelin and Gary L. Port

It is certified that error appears in the above-identified patent and that said Letters Patent is hereby corrected as shown below:

```
Column 1, line 42, "spread" should read -- spreads --.
Column 1, line 53, "claimped should read -- clamped --.
Column 1, line 62, "clearly" should read -- cleanly --.
Column 1, line 66, "eliminate" should read -- eliminates --.
Column 3, line 5, "groves" should read --grooves --.
Column 4, line 7, "portin" should read -- portion --.
Column 4, line 10, "portions" should read -- portion --.
Column 5, line 25, "firmaly" should read -- firmly --.
Column 5, line 46, "edgegs" should read -- edges --.
Column 5, line 49, "then" should read -- than --.
Column 6, line 10, "GIven" should read -- Given --.
Column 6, line 23, "being" should read -- begin --.
Column 6, line 41, "retirn" should read -- return --.
Column 7, line 3, "extend" should read -- extent --.
Column 7, line 12, "modificiation" should read -- modification;
    and "deparating" should read -- departing --.
Column 7, line 27 "thereby at one of said opposite walls, and"
    should read -- secured in said housing oppositely --.
Column 7, line 29 "bladed" should read -- blade --.
Column 7, line 50 after "of" delete "in".
Column 8, line 1 "spaced" should read -- spread --.
Column 8, line 9 "spaced" should read -- space --.
```

UNITED STATES PATENT AND TRADEMARK OFFICE
CERTIFICATE OF CORRECTION

PATENT NO. : 4,807,348

DATED : Feb. 28, 1989

INVENTOR(S) : John J. Kaelin and Gary L. Port

It is certified that error appears in the above-identified patent and that said Letters Patent is hereby corrected as shown below:

Column 8, line 17 after "cutter" "blade" should read --blades--.

Signed and Sealed this

Seventh Day of May, 1991

*Attest:*

HARRY F. MANBECK, JR.

*Attesting Officer*  *Commissioner of Patents and Trademarks*